No. 783,352. PATENTED FEB. 21, 1905.
J. BAKER.
HORIZONTAL ROTARY COOKER.
APPLICATION FILED JULY 22, 1904.
4 SHEETS—SHEET 4.
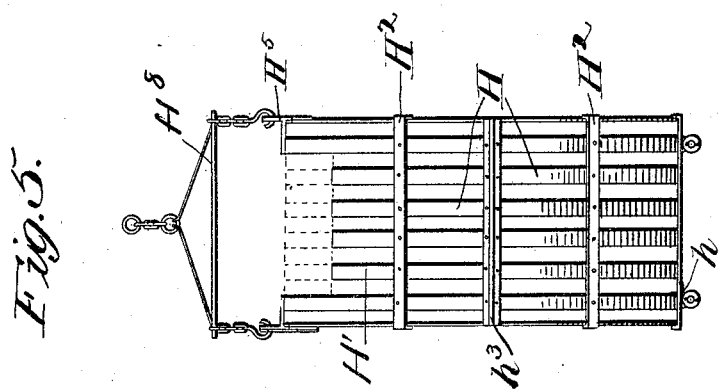
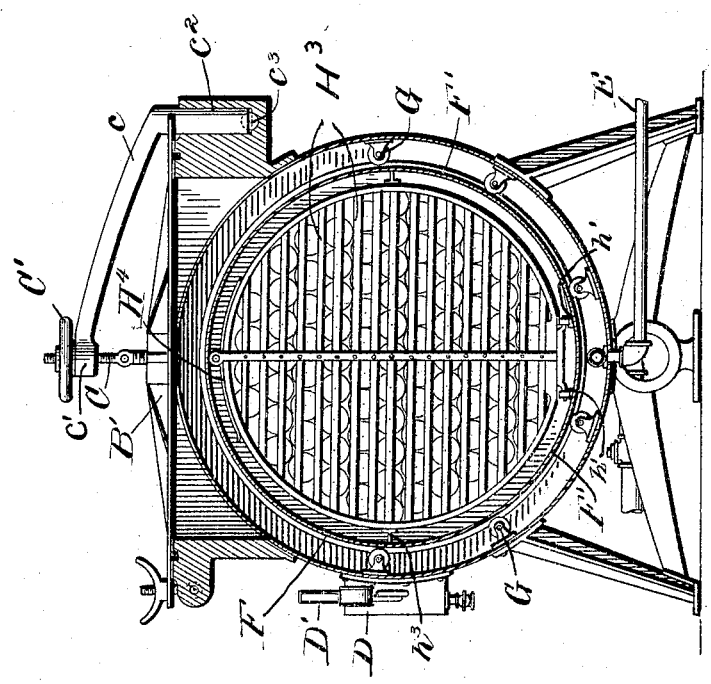
Witnesses
Wm F Doyle
James R Mansfield
Inventor
John Baker.
By Alexander Lowell
Attorneys No. 783,352.

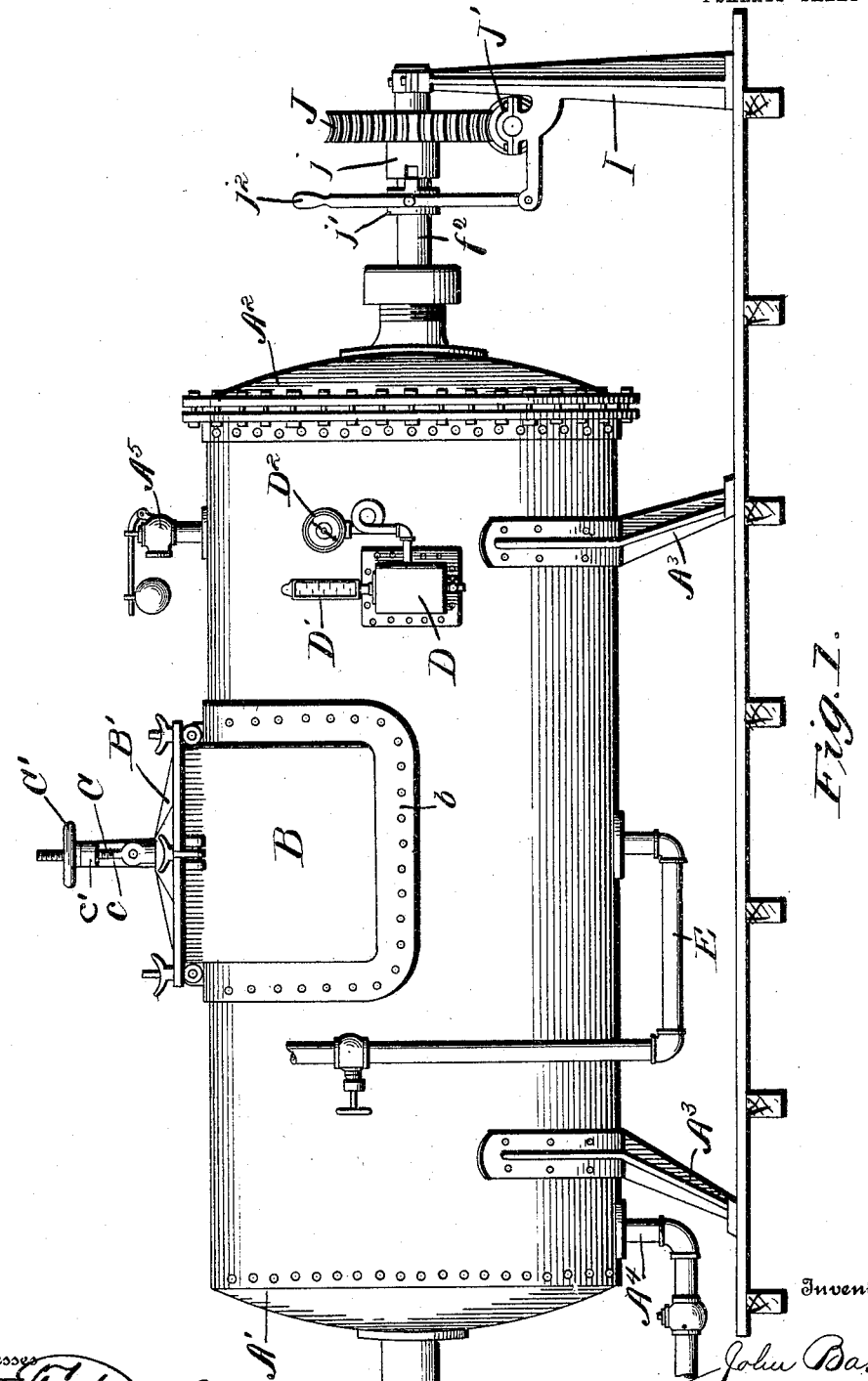

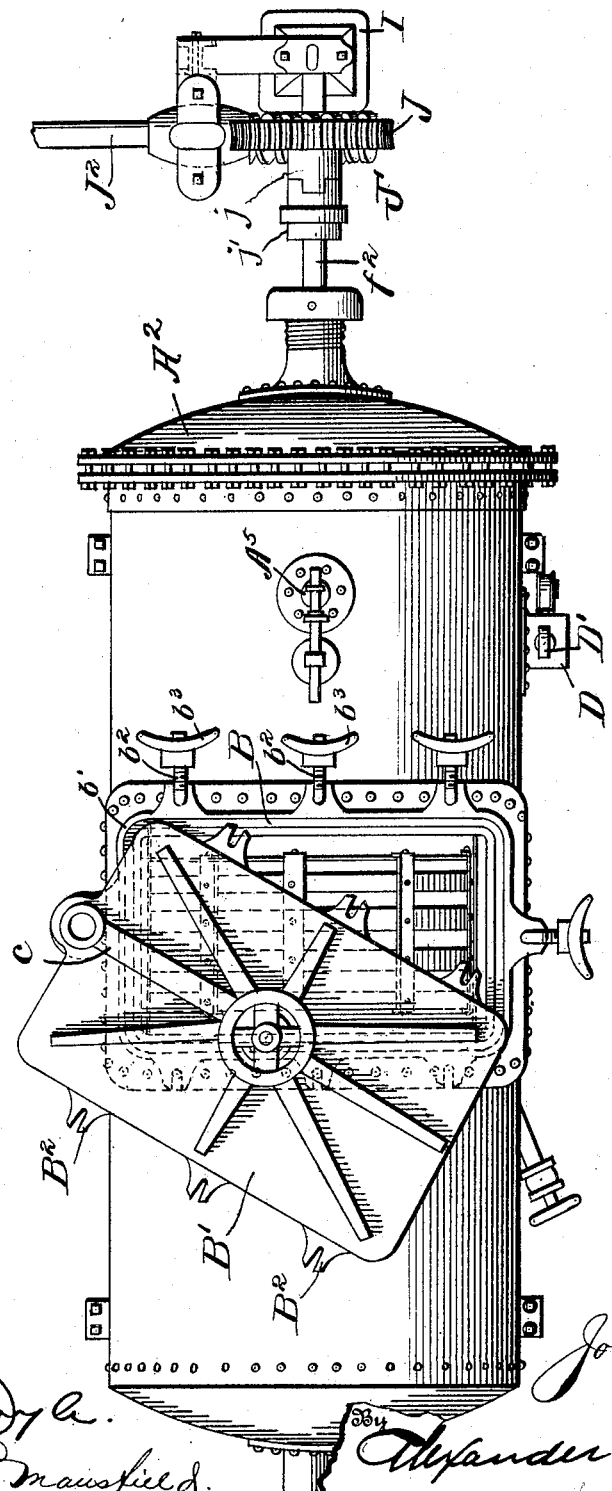

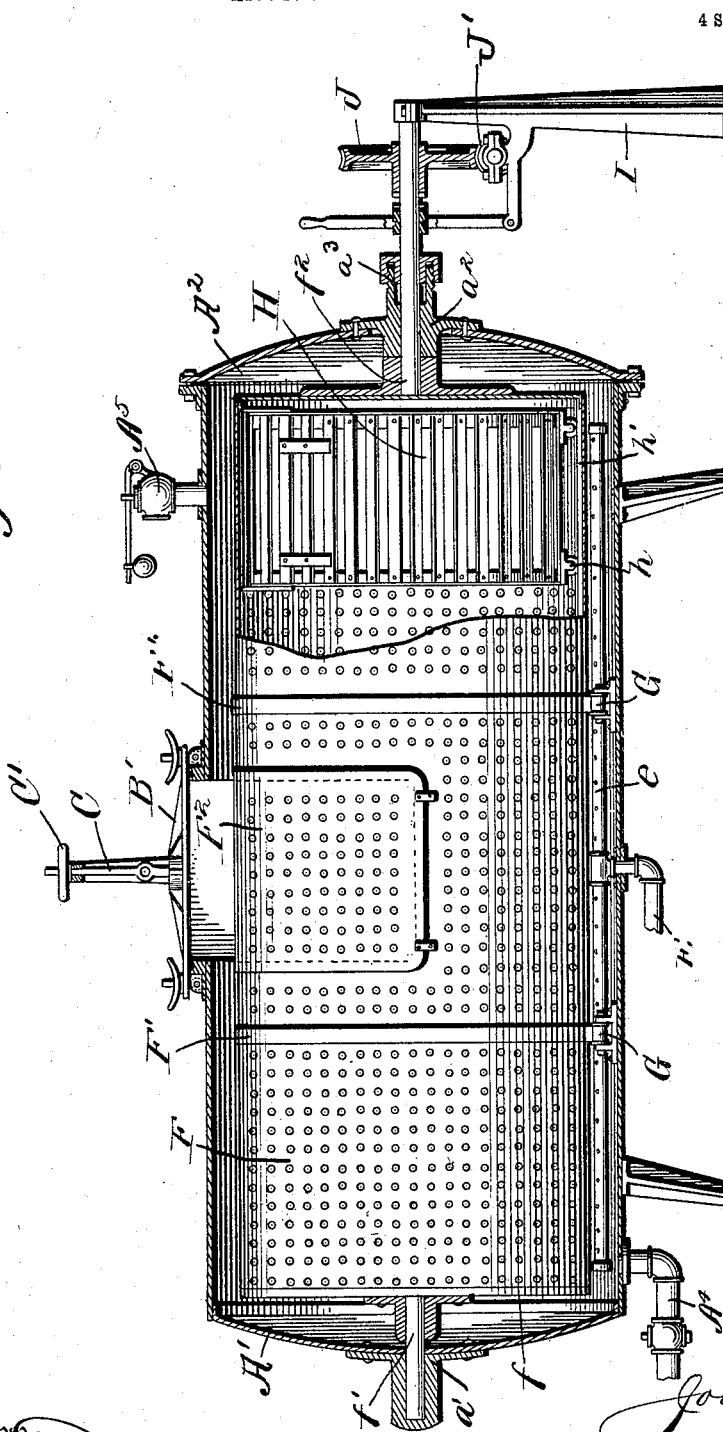

Patented February 21, 1905.

UNITED STATES PATENT OFFICE.

JOHN BAKER, OF HOOPESTON, ILLINOIS.

HORIZONTAL ROTARY COOKER.

SPECIFICATION forming part of Letters Patent No. 783,352, dated February 21, 1905.

Application filed July 22, 1904. Serial No. 217,725.

*To all whom it may concern:*

Be it known that I, JOHN BAKER, of Hoopeston, in the county of Vermilion and State of Illinois, have invented certain new and useful Improvements in Horizontal Rotary Cookers; and I hereby declare that the following is a full, clear, and exact description thereof, reference being had to the accompanying drawings, which form part of this specification.

This invention is an improvement in apparatus for cooking or sterilizing canned goods, either by steam or hot water, or both; and its object is to provide a cooker of large capacity occupying but little space and in which the goods can be kept in continuous motion during the cooking operation, thereby insuring a more uniform cooking of the goods and more uniform distribution of heating throughout the entire apparatus.

The invention, in brief, comprises a heating tank or chamber which has preferably a horizontal cylinder adapted to be closed steam-tight and within which is a rotatable cage which is preferably arranged to rotate on a horizontal axis and in which the goods to be cooked are placed and moved by the rotation of the cage during the cooking or sterilizing process. I also provide crates or baskets adapted to contain a number of cans or packages of goods to be cooked and which may be readily placed in and removed from the cage, and means are provided to facilitate the opening and closing of this cylinder and the insertion and removal of the filled crates. Means are also provided for supplying the chamber with hot water or steam, or both, for regulating its temperature and the pressure therein and for venting the same when it is necessary to remove the cooked contents therefrom.

The invention will be more fully explained hereinafter in describing the particular apparatus illustrated in the drawings, which embodies various features of the invention and which I now consider the best form thereof; but I do not desire to restrict myself to the specific apparatus shown in said drawings and refer to the claims for summaries of the novel features and combinations of parts embodying the invention for which protection is desired.

In said drawings, Figure 1 is a side view of the complete apparatus. Fig. 2 is a top plan view of the apparatus with the cover partly opened. Fig. 3 is a longitudinal sectional elevation thereof, the interior cage being broken to show the crate therein. Fig. 4 is a transverse sectional view. Fig. 5 is a detailed side view of one of the crates.

A designates a drum or cylinder which is preferably made of copper or galvanized iron and is closed at both ends by strong heads $A'$ $A^2$. The head $A'$ may be riveted in the end of the cylinder, and the head $A^2$ may be detachably secured thereto by means of securing flanges and bolts, as indicated in the drawings. The cylinder may be of any desired length and dimensions and is preferably arranged horizontally, as indicated in the drawings, and supported on legs $A^3$, as shown. It is provided with a drain-pipe $A^4$, closed by a suitable valve. The cylinder A has an opening in its top, preferably near its center, the opening being of a width almost equal to the diameter of the cylinder, so that the can-crates may be put in or removed from the cylinder through said opening. This opening, however, is surrounded by a collar B, which may be of wrought or cast metal, and is provided with a base-flange $b$, which is riveted to the adjacent surfaces of the cylinder, so as to make steam-tight joint therewith. In the upper ends of the side walls of the collar B is a circumferential groove in which is placed a packing $b'$, which is adapted to make a steam-tight joint with the cover $B'$, which cover is provided with bifurcated lugs $B^2$, which when the door is in closed position is adapted to be engaged by swinging bolts $b^2$, pivoted to the collar and provided with hand-nuts $b^3$, which can be tightened so as to bind the cover steam-tightly over the collar and close the cylinder. The cover is pivotally connected at center to a bolt C, which extends upward through a hub $c'$ on the inner end of a swinging arc or crane $c$, which is swiveled in a bearing $c^2$ in the casting attached to one side of the collar, a ball-bearing $c^3$ being placed at the bottom of the socket $c^2$, so as to facilitate the swinging movement of the crane. A hand-nut $c^3$ is screwed on the upper end of the bolt C above the hub $c'$, and by means of this hand-nut the cover $B'$ may be lifted clear of the collar and suspended on the crane $c$, so that it can be readily swung to one side out of the way, so that the can-crates may be put in or removed from the cylinder from the opening therein. The crates may be handled by ordinary overhead tackle, which is not shown in the drawings.

The cylinder A has a casting D attached to its side over an opening therein, and to said casting is connected a thermometer D' and a pressure-cage $D^2$ to indicate, respectively, the temperature and pressure within the cylinder. A safety-valve or blow-off $A^5$ is also provided, as shown in the drawings.

Steam may be admitted to the cylinder from a suitable source of supply through the pipe E, which has a suitable valve and which connects with a pipe $e$ inside the cylinder and extending longitudinally thereof at bottom. This pipe $e$ is numerously perforated in the top and is designed to distribute the steam equally throughout the length of the heating chamber or cylinder.

Within the cylinder A is a rotary cage F, which is preferably composed of a large perforated or recticulated metal cylinder, preferably closed at its ends by metal plates $f$, to which may be attached stub-shafts $f'$ and $f^2$, arranged in axial alinement and which are respectively journaled in a casting $a'$ and $a^2$ in the heads of the cylinders. The shaft $f^2$ extends through the casting $a^2$, and a stuffing-box $a^3$ is provided to prevent leakage at this point. The shaft $f^2$ is the driving-shaft, by which the cage is rotated by means hereinafter explained. The cage may be supported intermediate its trunnions or shafts $f'$ $f^2$ by means of circumferential ribs or bands F', which engage flanged rollers G, journaled in suitable castings attached to the interior of the cylinder A at the sides and below the cage, said rollers assisting in supporting the cage in its rotary movements and in keeping it from lateral slip. The number of these bands F' and rollers G used will depend upon the length of the cage. The cage is provided centrally with an opening, closed by a door $F^2$, said opening corresponding in location and practically in size with the opening in the cylinder A, and the door $F^2$ is provided with suitable closures by which it can be held closed while the cage is in operation, while it can be removed through the opening in the cylinder when the cover B' is removed, the cage being stopped with the door $F^2$ uppermost and being filled and emptied when in this position.

In the bottom of the cage F are two parallel grooved track-rails $h'$, which are engaged by the wheels or rollers $h$, attached to the bottoms of the can-crates H, which crates or baskets are cylindrical in end elevation and are of a diameter and length which will allow them to be inserted and removed from the opening closed by the covers B' and $F^2$. The can-crates are preferably made of metal, as in Figs. 3, 4, and 5, the preferred form being shown in Figs. 4 and 5, and their sides may be composed of hoops H', connected by longitudinal strips $H^2$, and ends may be composed of parallel straps $H^3$, Fig. 4, the bottom of the crates being slightly flattened and the rollers $h$ attached thereto, as shown in the drawings. An opening may be left in the top of the crate, and this opening can be closed by a cover $H^4$, which is provided with suitable closures to retain the cans in the crate. The crates may be provided with exterior ribs $h^3$ on some of the bars $H^2$, which are adapted to fit pretty closely against the sides and end walls of the cage, and thus prevent the crates dipping or tumbling about to any injurious extent within the cage. To facilitate the removal and insertion of the crates in the apparatus, each crate may be provided with eye-straps $H^5$ at its opposite sides, projecting slightly above its top, adapted to be engaged by the lifting-tackle $H^8$, as indicated in Fig. 5 of the drawings.

The outer end of the shaft $f^2$ is journaled in the upper end of a standard I, suitably supported on the foundation adjacent to the cylinder, and on this shaft is loosely journaled a worm-gear J, which is driven by a worm J' on a counter-shaft $J^2$, which may be itself driven by a suitable prime mover. This gear J has a clutch-face $j$, which is adapted to be engaged by a sliding clutch $j'$, keyed to shaft $f'$, and which may be thrown into or out of engagement with the clutch $j$ by means of the hand-lever $j^2$, as indicated in the drawings. Thus the operator can readily start or stop the cage without having to stop the prime mover or shaft $J^2$.

The operation of the apparatus is as follows: The cage is stopped with its opening uppermost, and the opening in the cylinder is uncovered, as well as the opening in the cage, and then crates filled with canned goods to be cooked or sterilized are lowered into the cage, so that their wheels rest upon the tracks $h'$, and the crates are then moved right or left in the cage until the latter is filled. Then the cover $F^2$ is replaced and securely fastened and then the cover B' fastened steam-tightly. The cylinder may, if desired, have been previously partly filled with hot water if it is desired to use hot water in the cooking. The steam is then admitted through the pipe E and the cage started, rotating through the described means, this rotation being continued during the cooking of the goods. Naturally the movement of the cage keeps all the cans in continuous movement, which of itself greatly facilitates the rapid heating and cooking of the contents thereof, and at the same time, owing to the agitation or stirring produced by this motion of the cage and its contents, the heat is thoroughly and equally disseminated through the entire chamber, and all the goods are subjected to a like uniform temperature. This shortens the time necessary to sterilize or cook the goods, and the contents of every can or package is equally cooked. This process of rotating the cans produces a stirring movement of the contents of the cans, as well as of the medium in which the cans are moving, and is productive of the most beneficial results, as the heat penetrates quickly to the interior of the cans and equally cooks the contents thereof. I can also obtain a uniform and high temperature in my cooking apparatus without necessarily having to exhaust the steam in order to obtain a circulation and distribution of heat.

I prefer to arrange cookers horizontally, for the reason that they can be made of any desired length and capacity without materially increasing the labor necessary to handle the crates, all of which will have to be lifted only the same distance in placing them or removing them from the cooker, whereas in the vertical cooker it is necessary to insert the crates at the top, and hence the practical size of such vertically-arranged cooker is materially limited, and, again, in such cookers if water is used the goods at the top would be practically out of the water. In my machine all the water necessary for use in the cooking process can be retained in the cooker, while the steam is drawn off through the safety-valve and the can-crates can be easily handled without danger to the workman.

By employing the rotary cage within the stationary fixed cylinder or chamber great economy is produced in construction, as it is not necessary to provide any revoluble steam or water fittings, and the construction of the outer cylinder does not have to be so heavy as it would be if it were made rotatable.

Having thus described my invention, what I claim as new, and desire to secure by Letters Patent, is—

1. A rotary cooking apparatus, the combination of a heating-chamber, a rotatable perforated cage in said chamber, provided with tracks and removable can-crates adapted to be placed in said cage and having wheels to rest upon said tracks, and means for rotating said cage on its longitudinal axis.

2. In a rotary process-kettle, the combination of a horizontal stationary cylinder having an opening in its top, means for closing said opening, a horizontal perforated cage within said cylinder, means exterior to said cylinder for rotating said cage, said cage having an opening in its side adapted to coincide with the opening in the cylinder, a perforated steam-pipe in the bottom of said cylinder exterior to the cage, steam-supply pipe connecting with said perforated pipe, circumferential supporting-bands on the cage intermediate its ends, and rollers engaging said bands attached to the inner walls of the cylinder; with removable can-crates adapted to be placed in said cage and be axially rotated thereby during the cooking process.

3. The combination of a heating-chamber, an axially-rotatable cylinder or cage secured therein and removable can crates or baskets adapted to be placed in said cage and rotated thereby within the chamber during the cooking process.

4. The combination of a non-rotatable heating-chamber, a rotatable cage secured within said heating-chamber, removable can-holders adapted to be placed in said cage and rotated thereby, and means for retaining the can-holders in position in the cage, substantially as described.

5. The combination of a stationary heating-cylinder having a door at one side, a rotatable perforated cage axially arranged within said cylinder and having a door in its side adapted to coincide with the door of the cylinder, and means for rotating said cage; with can-holding crates adapted to be placed within said cage and be rotated thereby during the cooking process, and means for retaining the crates in position in the cylinder while being rotated.

6. The combination of a stationary horizontal cylinder, a horizontally-disposed cylindrical cage within the cylinder and arranged axially thereof, and means for rotating said cage; with removable can-holding crates in said cage, and means for retaining the crates in position in the cylinder while being rotated, and means for admitting a heating medium to said cylinder.

7. In combination with a stationary cylinder, the rotatable perforated cylindrical cage axially disposed within said cylinder, having trunnions on its ends journaled in bearings in the ends of said cylinders, one of said trunnions projected through the cylinder-head, and gearing for driving said cage exterior to the cylinder, crate supports and retainers within the cage, and can-crates adapted to be placed in said cage and rotated thereby, substantially as described.

8. The combination of a horizontally-disposed closed heating-chamber having an opening in its top, means for supplying a heating medium thereto, a horizontally-disposed non-removable perforated cage axially arranged within the said chamber, and having an opening in its side adapted to coincide with the opening of the chamber, means for rotating said cage on its horizontal axis, suitable closures for the openings in the cage and in the chamber, removable can-holding crates adapted to be placed in the said cage, and means for retaining the crates in position in the cage while being rotated thereby, for the purpose and substantially as described.

In testimony that I claim the foregoing as my own I affix my signature in presence of two witnesses.

JOHN BAKER.

In presence of—
CHARLES E. WHITTON,
NORMAN BAKER.